Inventors:
Donald P. Shattuck,
Pritindra Chowdhuri,
Donald K. Bisson,
by Charles W Helzer
Their Attorney.

United States Patent Office 3,215,896
Patented Nov. 2, 1965

3,215,896
FAST RESPONSE OVERLOAD PROTECTION CIRCUIT
Donald P. Shattuck, Erie, Pa., and Pritindra Chowdhuri, Schenectady, and Donald K. Bisson, Auburn, N.Y., assignors to General Electric Company, a corporation of New York
Filed Oct. 4, 1962, Ser. No. 228,304
7 Claims. (Cl. 317—16)

The present invention relates to a fast response overload protection circuit.

More particularly, the invention relates to a new and improved high speed electronic switch employing silicon controlled rectifiers for providing fast action protection for a load device from an overload condition.

There is presently available in the art, a high speed switch (referred to as an electronic crowbar) which employs silicon controlled rectifiers connected in circuit relationship with the trip coil of a conventional circuit breaker device to accelerate the action of the circuit breaker. This arrangement, while satisfactory for many purposes, is not adequate for some applications due to the time delay involved in building up current in the trip coil of the circuit breaker to a value sufficient to actuate the breaker. To overcome this difficulty, the present, extremely fast action-electronic switch was devised.

It is, therefore, the primary object of the present invention to provide an extremely fast action electronic switch employing silicon controlled rectifiers to provide high speed protection against overload conditions.

In practicing the invention, a fast response overload protection circuit is provided which comprises of sensing means operatively coupled in circuit relationship with a load to be protected across a source of electric potential for sensing overload conditions. A gating signal source is operatively coupled to the sensing means, and is triggered by the sensing means to develop an output gating signal in response to an overload condition. At least one silicon controlled rectifier device is connected directly across the source of electric potential, and has its gating electrode operatively coupled to the output of the gating signal source for short circuiting the source of electric potential in the event of an overload condition. In preferred embodiments of the invention, a comparatively inexpensive circuit breaking device such as a current limiting fuse is connected intermediate the short circuiting silicon controlled rectifier and the source of electric potential, and operates to clear the line once the silicon controlled rectifier has been rendered conductive, and short circuits the load to be protected.

Figure 1:
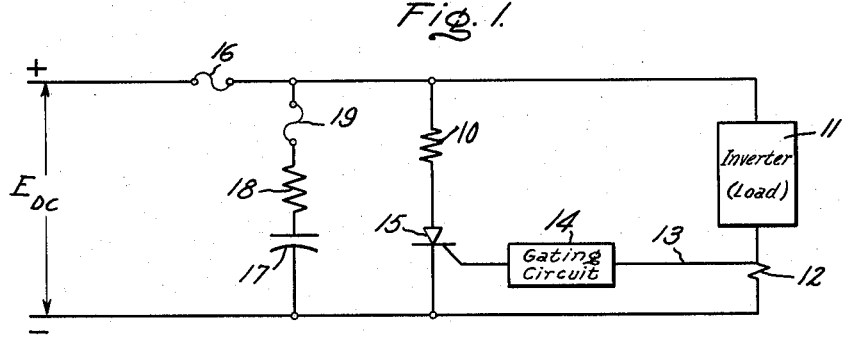
Figure 2:
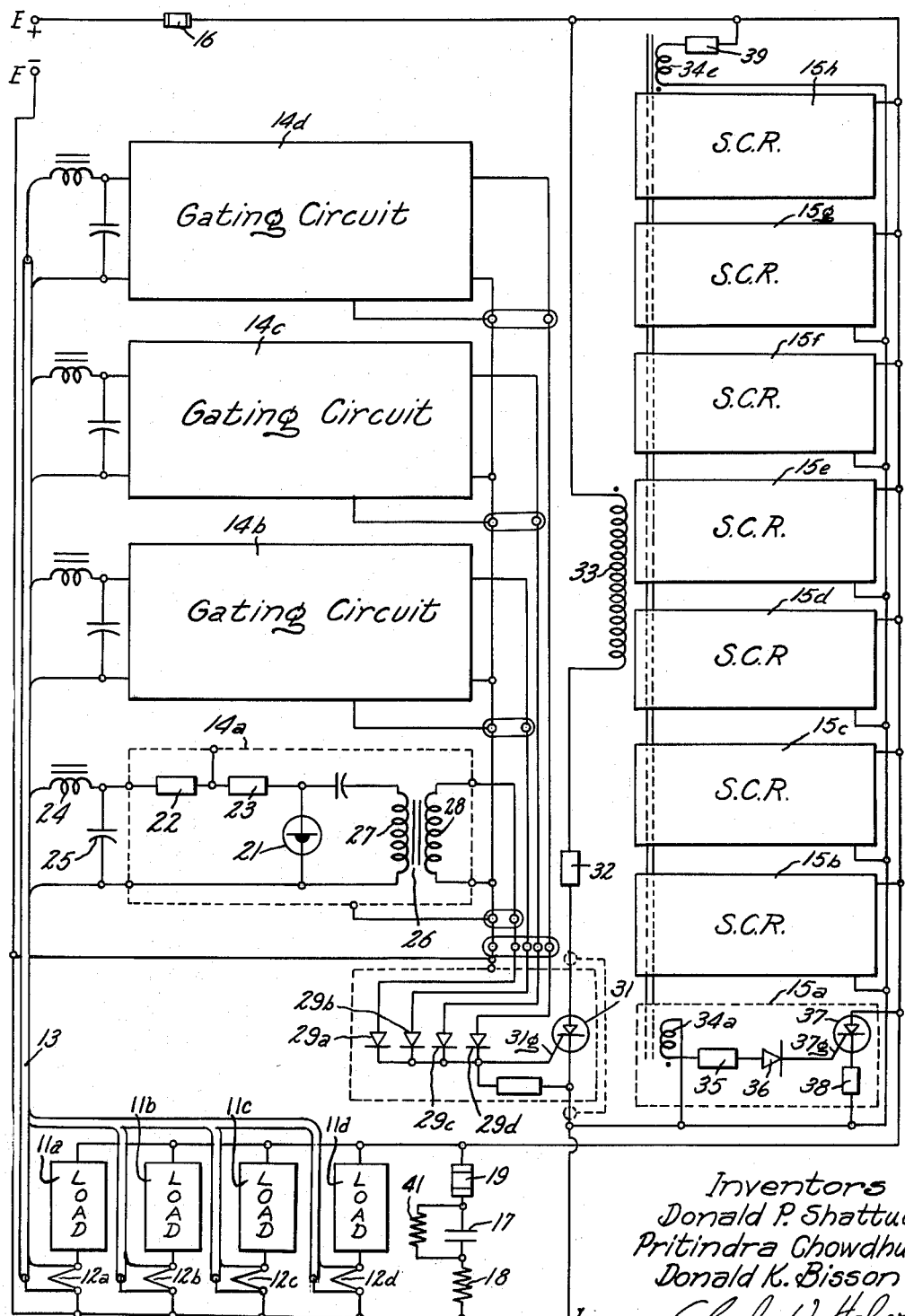

Other objects, features and many of the attendant advantages of this invention, will be appreciated more readily as the same becomes better understood by reference to the following detailed description, when considered in connection with the accompanying drawings, wherein like parts in each of the several figures are identified by the same reference character, and wherein: FIGURE 1 is a functional block diagram of a fast response overload protection circuit constructed in accordance with the present invention; and FIGURE 2 is a detailed circuit diagram of a practical embodiment of this circuit employed in connection with an inverter to protect the components of the inverter from overload conditions.

The fast response overload protection circuit illustrated in functional block diagram form in FIGURE 1 of the drawings is comprised by an inverter 11 or other load to be protected which is connected in series circuit relationship with a sensing means comprised by a very low inductance resistor 12. The series circuit comprised by the load 11 and overload sensing resistor 12 is connected across the terminals of a direct current power supply $E_{dc}$ not shown. The sensing resistor 12 is connected through a suitable conductor 13 to the input of a gating circuit 14 which is in turn connected to the gating electrode of a silicon controlled rectifier 15. The silicon controlled rectifier 15 is connected through a current limiting resistor 10 of very small value across the terminals of the source of electric potential $E_{dc}$ in parallel with the load 11 to be protected and series connected resistor 12. To complete the preferred arrangement of the circuit, a relatively inexpensive circuit breaking device such as a fuse 16 is connected in series circuit relationship with the silicon controlled rectifier 15 between the silicon controlled rectifier 15 and the source of electric potential $E_{dc}$.

Since the load 11 to be protected is an inverter, it is anticipated that the circuit will be employed in conjunction with a large capacitance, illustrated at 17, connected across the source of electric potential $E_{dc}$ in parallel with the silicon controlled rectifier 15. This large capacitance 17 which normally takes the form of a bank of capacitors is connected through the resistor 18 and comparatively low-cost circuit breaking device such as a fuse 19 across the terminals of the direct current power supply. The presence of the large capacitance 17 is dictated by the nature of the load 11 in order to damp out any variations or fluctuations in the voltage of the direct current power supply $E_{dc}$ due to the switching action of the inverter load.

In operation, upon the occurrence of an overcurrent condition, a trigger voltage will be built up across the sensing resistor 12 which is supplied to the gating circuit 14 to cause the gating circuit 14 to produce an output gating signal that is applied to the gate electrode of the silicon controlled rectifier 15. Upon the silicon controlled rectifier 15 being turned on by the gating signal, the short circuit current will be directed through the silicon controlled rectifier, thereby diverting current flow from inverter load 11 and protecting it from the overload condition. This short circuit current will continue to flow for the period of time required for the circuit breaker or fusing device 16 to open the circuit, and thereby remove the entire system from across the source of potential $E_{dc}$. It should be noted, however, that the load or the inverter 11 is protected instantaneously upon the short circuiting silicon controlled rectifier 15 being turned on since the main current through the system will be diverted through the short circuiting silicon controlled rectifier 15 instantaneously. Thus, the dangerous overcurrent is removed from the inverter 11 instantaneously and diverted through the short circuiting silicon controlled rectifier 15 for the period of time required to actuate the circuit breaker or fusing device 16. Hence, any time delay involved in actuating the circuit breaker or fusing device 16 will not result in injury to the equipment 11 being protected.

In the case of inverter load 11 shown in FIGURE 1, which requires the large capacitance 17 connected across the terminals of the source of electric potential $E_{dc}$, the presence of this large capacitance will result in the production of additional discharge current flowing through short circuiting silicon controlled rectifier 15 because of its extremely low impedance in its conducting state. Because of this additional discharge current might tend to damage the short circuiting silicon controlled rectifier 15 if it were allowed to continue for any extended period, the current limiting resistor 18 and circuit breaker fusing device 19 are connected in series with the large capacitance 17 across the terminals of the direct current power supply. With this arrangement, it is necessary only that the silicon controlled rectifier 15 discharge the large capacitance 17 to an extent required to actuate the circuit breaker or fusing device 19 which upon opening will remove the capacitance 17 from the line. It should be noted that the circuit should be designed so that the short circuit path provided by SCR-15 and resistor 10 has the lowest possible impedance consistent with the current rating of SCR-15. This impedance in all events should be lower than the inverter or load impedance 11, the line impedance including that of fusing device 16, or the impedance of fusing device 19, resistor 18 and capacitor 17. By this expedient it is assured that very little or no voltage will be applied to the load 11 to be protected due to the short circuit current flowing through SCR-15.

Upon opening of the fusing devices 16 and 19, conduction through the silicon controlled rectifier 15 will, of course, terminate, and it will be necessary to correct the condition which brought about the overload in the first instance, and to replace the low cost circuit breaker fusing devices 16 and 19 prior to again initiating operation of the inverter 11. It can be appreciated, however, that upon the occasion of an overload condition, the proposed circuit provides almost instantaneous protection for the load equipment 11 being subjected to the overload condition.

A practical embodiment of a fast response overload protection device is illustrated in FIGURE 2 of the drawings. The device is intended for use in protecting a plurality of loads 11a through 11d, which may comprise single phase inverters. For this purpose, the device includes a sensing means comprised by a low inductance resistor 12a through 12d connected in series circuit relationship with a respective load 11a through 11d across the terminals of a direct current source of electric potential indicated by the terminals marked E+ and E-. The voltage buildup across the current sensing resistors 12a through 12d due to an overcurrent condition or the like, is supplied through a conductor 13 to inputs of the several gating circuits 14a through 14d. Since all of the gating circuits 14a through 14d are identical in construction and operation, only the gating circuit 14a will be described in detail. This gating circuit comprises a gating pulse generator and is formed by a tunnel diode device 21, which as is well known in the art, has two stable states of operation, and is biased by means of a biasing circuit comprised by the resistors 22 and 23 to operate normally in one of the stable states of operation. This condition of operation is not affected for so long as the current through the load 11a is within prescribed values. However, upon the occurrence of an overcurrent condition, a voltage will be built up across the current sensing resistor 12a. This voltage is supplied through a smoothing filter comprised by an inductor 24 and capacitor 25 across the tunnel diode 21 to cause it to change to its second stable state of operation. Upon this occurrence, a voltage pulse will be produced which is supplied through the first pulse transformer 26 having its primary winding 27 connected across the tunnel diode 21, and having its secondary winding 28 connected through a coupling diode 29 to the control gate element 31g of a master gating silicon controlled rectifier 31. The gating circuits 14b, 14c, and 14d are similarly connected through the secondary windings 28 of pulse transformers 26 associated with these circuits, and through respective coupling diodes 29b, 29c, and 29d to the master gating electrode 31g of the gating silicon rectifier 31. The gating silicon controlled rectifier 31 is connected through a current limiting resistor 32, and the primary winding 33 of a second pulse transformer across the source of electric potential. As a consequence of this construction, upon any one of the tunnel diodes 21 in any one of the gating circuits 14a through 14d being shifted from its normal state of operation to its second mode of operation, a current pulse will be induced in the secondary winding of the first pulse transformer 26 which is supplied through the coupling diode 29a to the gating electrode 31g of the gating SCR-31. Upon the gating SCR-31 being rendered conductive, a large gating or signal pulse will be produced in the primary winding 33 of the second pulse transformer.

The second pulse transformer has a plurality of secondary windings 34a through 34i which are coupled to and comprise a part of the short circuiting silicon controlled rectifier circuits 15a through 15h. Each of these secondary windings are connected through a respective resistor 35 and coupling diode 36 to the gating electrode 37g of the respective short circuiting silicon controlled rectifiers 37. Each of the short circuiting silicon controlled rectifiers 37 is connected in series circuit relationship with a very small current sharing resistor 38 having a value of in the neighborhood of 0.005 ohm directly across the source of electric potential. The current sharing resistors 38 serve the same function and correspond to the current sharing resistor 10 of the circuit shown in FIGURE 1. Hence, upon the silicon controlled rectifiers 37 being rendered conductive, there will be a plurality of parallel short circuiting paths established across the source of electric potential. Accordingly, upon a gating pulse being produced in the primary winding 33 of the second pulse transformer by the gating SCR 31 being turned on, the gating pulse will in turn induce gating pulses in the plurality of secondary windings 34a through 34i to turn on the short circuiting silicon controlled rectifiers 37 connected to each respective secondary winding. As a consequence, all the short circuiting silicon controlled rectifiers will be turned on simultaneously by the same gating pulse to thereby instantaneously short circuit the source of electric potential, and results in removing the overcurrent condition from the load 11 to be protected. It might be noted that the additional secondary winding 34i in the second pulse transformer operates in conjunction with a resistor 39 having a value in the neighborhood of 5 kilohms, to reset the core of the pulse transformer 33 after each operation of the fast response overload protection circuit. This is necessitated by the fact that the core of the pulse transformer 33 is driven into saturation each time that the gating silicon controlled rectifier 31 is turned on, and it must be reset by the current drawn through winding 34i and resistor 39 before it is again operated.

It should also be noted that each of the short circuiting silicon controlled rectifier circuits 15a through 15h is connected in series circuit relationship with a relatively low cost circuit breaking device 16 which in practice may comprise a fuse, but which has a comparatively long time delay required in heating up the fusing device to open circuit the load being protected. It can, therefore, be appreciated that the short circuiting silicon controlled rectifiers 15a through 15h, which are almost instantaneous in their response to the overcurrent condition for a short time, carry the full overcurrent until such time that the fusing device 16 opens the entire circuit. In this manner, the equipment or load 11 being protected will be provided instantaneous protection against the overcurrent. Since the short circuiting silicon controlled rectifiers 37 have not been previously in a conducting state, they will not be endangered by the large overcurrent carried through them for the short period of time required to actuate fusing device 16.

It should also be noted that when the load 11 requires a large capacitance such as 17 to be connected in parallel with it across the terminals of the source of electric potential, the relatively inexpensive fusing device 19 may be connected in series with capacitance 17 along with a current limiting resistor 18, and if desired, a bleeding resistor 41 connected in parallel with capacitance 17. The series circuit thus comprised is connected across the terminals of the source of electric potential in parallel with load 11 and sensing resistor 12, and short circuiting silicon controlled rectifiers 37. As a consequence of this arrangement, upon the short circuiting silicon controlled rectifiers 37 being turned on, the energy stored in capacitance 17 will not have to be completely discharged through the silicon controlled rectifiers, and, therefore, possibly overloading these devices. Instead, discharge of the capacitance 17 takes place for only so long as is required to activate the circuit breaker or fusing device 19, which then operates to remove capacitance 17 from further loading the short circuiting silicon controlled rectifiers 37. The series connected resistor 18 limits the discharge current during the period of time required for the fusing device 19 to blow and clear the capacitance load off of the line. The bleeder resistor 41 is used to completely discharge the capacitance 17. It should be further noted that the silicon controlled rectifiers used in the fast action short circuit device do not have to meet any rigid requirements for turn-off time as might be required of the SCR's in an inverter circuit being protected. Further, the SCR's in the fast action protection device do not have to have high PRV ratings, nor do they require complicated control circuitry.

From the foregoing description, it can be appreciated, therefore, that the invention makes available an extremely fast action electronic switch employing silicon controlled rectifiers which provides high speed protection against overload conditions in large electrical devices. The fast action is made possible since it is not required that current be built up in a trip coil of a conventional circuit breaker device to a value sufficient to actuate the trip, or to heat a fusable element to the point of breakdown, hence, making possible positive protection through actuation of the device in a matter of microseconds.

Having described one embodiment of a fast response overload protection circuit constructed in accordance with the invention, it is believed obvious that other modifications and variations are possible in line with the above teachings. It is, therefore, to be understood that changes may be made in the particular embodiment in the invention described which are within the full intended scope of the invention as defined by the claims.

What we claim as new and desire by Letters Patent of the United States is:

1. A fast response overload protection circuit including in combination sensing means comprising a resistor operatively coupled in series circuit relationship with a load to be protected across a source of electric potential a gating signal source comprising a plurality of gating pulse generators each operatively coupled across said sensing resistor, a first set of pulse transformers each having its primary winding coupled across a respective associated gating pulse generator, a master gate controlled solid state conducting device having its gating electrode operatively coupled to the secondary windings of each of said first pulse transformers, a second pulse transformer having a primary winding and a plurality of secondary windings with the primary winding being coupled across the master gate controlled solid state conducting device, and a plurality of short circuiting gate controlled solid state conducting devices connected in parallel circuit relationship directly across the source of electric potential with the gating electrodes of the short circuiting gate controlled solid state conducting devices being connected to a respective secondary winding of said second pulse transformer for short circuiting the source of electric potential in the event of an overload condition.

2. The combination set forth in claim 1 further characterized by a comparatively inexpensive circuit breaking device connected in series circuit relationship with the short circuiting gate controlled solid state conducting devices and the source of electric potential.

3. The combination set forth in claim 1 further characterized by a relatively low value resistor connected in load current carrying series circuit relationship with each one of said short circuiting gate controlled solid state conducting devices, and a comparatively inexpensive fusing device connected in series circuit relationship with the short circuiting gate controlled solid state conducting devices and the source of electric potential.

4. The combination set forth in claim 1 wherein the load to be protected includes a relatively large capacitance, and further characterized by a relatively low current fusing device connected in series circuit relationship with the load capacitance to facilitate open circuiting of the load capacitance upon the short circuiting gate controlled solid state conducting devices being rendered conductive.

5. The combination set forth in claim 1 further characterized by a resetting winding inductively coupled to the second pulse transformer for resetting the core of the second pulse transformer after each operation of the overload protection circuit.

6. The combination set forth in claim 1 further characterized by a comparatively inexpensive circuit breaking device connected in series circuit relationship with the short circuiting gate control solid state conducting devices and the source of electric potential, and a resetting winding inductively coupled to the second pulse transformer for resetting the core of the second pulse transformer after each operation of the overload protection circuit.

7. The combination set forth in claim 1 further characterized by a relatively low value resistor connected in load current carrying series circuit relationship with each one of said short circuiting gate controlled solid state conducting devices, a comparatively inexpensive circuit breaking device connected in series circuit relationship with the short circuiting gate controlled solid state conducting devices and the source of electric potential, and a resetting winding inductively coupled to the second pulse transformer for resetting the core of the second pulse transformer after each operation of the overload protection circuit.

References Cited by the Examiner
UNITED STATES PATENTS

| 2,571,027 | 10/51 | Garner | 317—16 X |
| 2,925,548 | 2/60 | Scherer | 317—16 |

FOREIGN PATENTS 1,300,021   6/62   France.

OTHER REFERENCES

Gutzwiller: Electro-Technology, "Using the Silicon Controlled Rectifier for Protection," October 1961, pp. 130–132.

SAMUEL BERNSTEIN, *Primary Examiner.*